(12) United States Patent
Schultheiss et al.

(10) Patent No.: US 10,196,887 B2
(45) Date of Patent: *Feb. 5, 2019

(54) METAL-ORGANIC FRAMEWORKS AS POROUS PROPPANTS

(71) Applicant: Halliburton Energy Services, Inc., Houston, TX (US)

(72) Inventors: Nathan Carl Schultheiss, Kingwood, TX (US); Zheng Lu, Kingwood, TX (US); Humberto Almeida Oliveira, The Woodlands, TX (US); Denise Nicole Benoit, Houston, TX (US); Chandra Sekhar Palla-Venkata, Sugar Land, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/319,331

(22) PCT Filed: Jul. 15, 2014

(86) PCT No.: PCT/US2014/046719
§ 371 (c)(1),
(2) Date: Dec. 15, 2016

(87) PCT Pub. No.: WO2016/010525
PCT Pub. Date: Jan. 21, 2016

(65) Prior Publication Data
US 2017/0145299 A1    May 25, 2017

(51) Int. Cl.
*E21B 43/267*    (2006.01)
*E21B 43/04*    (2006.01)
(Continued)

(52) U.S. Cl.
CPC ............ *E21B 43/267* (2013.01); *C09K 8/03* (2013.01); *C09K 8/516* (2013.01); *C09K 8/536* (2013.01);
(Continued)

(58) Field of Classification Search
None
See application file for complete search history.

(56) References Cited

U.S. PATENT DOCUMENTS 5,648,508 A    7/1997    Yaghi
5,964,291 A *  10/1999   Bourne ............... C09K 8/80
                                              166/279
(Continued)

FOREIGN PATENT DOCUMENTS

WO    2013050402       4/2013
WO    2014116508       7/2014
WO    WO 2014116508 A1 *  7/2014 ............ C09K 8/524

OTHER PUBLICATIONS

International Search Report and Written Opinion of PCT Application No. PCT/US2014/046719 dated Mar. 31, 2015: pp. 1-11.
(Continued)

*Primary Examiner* — Anuradha Ahuja
(74) *Attorney, Agent, or Firm* — Chamberlain Hrdlicka

(57) ABSTRACT

Metal-organic frame-works (MOFs) and its compositions for use as proppants in a method of treating subterranean formations. A method comprising contacting the formation with a fluid composition comprising a metal-organic framework comprised of at least one metal ion and an organic ligand that is at least bidentate and that is bonded to the metal ion.

26 Claims, 2 Drawing Sheets

(51) Int. Cl.
  *C09K 8/70* (2006.01)
  *C09K 8/80* (2006.01)
  *C09K 8/03* (2006.01)
  *C09K 8/516* (2006.01)
  *C09K 8/536* (2006.01)
  *C09K 8/92* (2006.01)
  *E21B 43/26* (2006.01)
  *E21B 33/13* (2006.01)

(52) U.S. Cl.
  CPC ............... *C09K 8/70* (2013.01); *C09K 8/80* (2013.01); *C09K 8/92* (2013.01); *E21B 43/04* (2013.01); *E21B 43/26* (2013.01); *E21B 33/13* (2013.01)

(56) References Cited

U.S. PATENT DOCUMENTS

| | | | |
|---|---|---|---|
| 2003/0222023 A1 | 12/2003 | Mueller et al. | |
| 2007/0173417 A1* | 7/2007 | Kaufman | C09K 8/524 507/269 |
| 2008/0233460 A1* | 9/2008 | Zimmermann | H01M 8/04208 429/406 |
| 2008/0302570 A1 | 12/2008 | deBoer | |
| 2010/0286022 A1* | 11/2010 | Yaghi | B01J 20/226 514/1.1 |
| 2012/0079852 A1 | 4/2012 | Northrop et al. | |
| 2012/0118009 A1* | 5/2012 | Minhas | B01D 53/0462 62/617 |
| 2015/0034315 A1* | 2/2015 | Jiang | C09K 8/68 166/280.2 |
| 2015/0034318 A1* | 2/2015 | Jiang | E21B 43/25 166/300 |
| 2015/0240147 A1* | 8/2015 | Jiang | C09K 8/68 166/308.3 |
| 2016/0158691 A1* | 6/2016 | Kortunov | B01D 53/1475 423/228 |
| 2017/0051156 A1* | 2/2017 | Chilukuri | C23C 4/06 |

OTHER PUBLICATIONS

Li et al., "Design and synthesis of an exceptionally stable and high;y porous metal-organic framework," Nature, Nov. 1999, vol. 402: pp. 276-279.

Eddaoudi et al., "Design and synthesis of metal-carboxylate frameworks with permanent microporosity," Topics in Catalysis 9, 1999: pp. 105-111.

OKeeffe et al., "Frameworks for Extended Solids: Geometrical Design Principles," Journal of Solid State Chemistry, 2000, vol. 152: pp. 3-20.

Chen et al., "Interwoven Metal-Organic Framework on a Periodic Minimal Surface with Extra-Large Pores," Science, Feb. 2001, vol. 291: pp. 1021-1023.

Bahr et al., "Mechanical properties of cubic zinc carboxylate IRMOF-1 metal-organic framework crystals," Physical Review B, 2007, vol. 76: pp. 184106-1-184106-7.

Tan et al., "Mechanical properties of hybrid inorganic-organic framework materials: establishing fundamental structure-property relationships," Chem. Soc. Rev., 2011, vol. 40: pp. 1059-1080.

Millward et al., "Metal-Organic Frameworks with Exceptionally High Capacity for Storage of Carbon Dioxide at Room Temperature," J. AM. Chem. Soc., 2005, vol. 127(51): pp. 17998-17999.

Espinal et al., "Materials challenges in carbon-mitigation technologies," MRS Bulletin, Apr. 2012, vol. 37: pp. 431-438.

Harris et al., SPE 118717: "Proppant Transport of Fracturing Gels is Influenced by Proppant Type," SPE International, 2009: pp. 1-10.

Mahoney et al., SPE 163818: "Self-Suspending Proppant," SPE International, 2013: pp. 1-12.

* cited by examiner

METAL-ORGANIC FRAMEWORKS AS POROUS PROPPANTS

BACKGROUND OF THE INVENTION

Hydrocarbon-producing wells are often stimulated by hydraulic fracturing treatments. In hydraulic fracturing treatments, a viscous fracturing fluid, which also functions as a carrier fluid, is pumped into a producing zone to be fractured at a rate and pressure such that one or more fractures are formed in the zone. Particulate solids for propping open the fractures, commonly referred to in the art as "proppant," are generally suspended in at least a portion of the fracturing fluid so that the particulate solids are deposited in the fractures when the fracturing fluid reverts to a thin fluid to be returned to the surface. The proppant deposited in the fractures functions to prevent the fractures from fully closing and maintains conductive channels through which produced hydrocarbons can flow.

After the fracturing fluid, which is the carrier fluid for the proppant, deposits the proppant in the fracture, the fracture closes on the proppant. Such partially closed fractures apply pressure on proppant particles. For this purpose, the interstitial space between particles should be sufficiently large, yet possess the mechanical strength to withstand closure stresses to hold fractures open after the fracturing pressure is withdrawn. Thus, for instance, large mesh proppants exhibit greater permeability than small mesh proppants at low closure stresses, but they will mechanically fail and thereby produce very fine particulates ("fines") at high closure pressures.

Modifications of proppant particles could be used advantageously to improve their performance in hydraulic fracturing systems. First, if the proppant particles were less dense, a less viscous fracturing fluid could be used, which would still convey the particles to the target area but which would be easier to pump into the formation. Second, proppants should remain where they are placed throughout the lifetime of the well after they have been injected into a fracture line. If changes within the reservoir during well production force the proppants out of position, production equipment can be damaged, and the conductivity of the reservoir formation can be decreased as the reservoir pores are plugged by the displaced proppants. Third, the proppants in the system should be resistant to closure stress once they are placed in the fracture. Closure stresses can range from 1700 psi in certain shale gas wells, up to and exceeding 15,000 psi for deep, high temperature wells. Care must be taken that the proppants do not fail under this stress, lest they be crushed into fine particles that can migrate to undesirable locations within the well, thereby affecting production.

Sand is a common proppant, though untreated sand is prone to significant fines generation. Alternative proppant materials include ceramics and sintered bauxite.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

Figure 1:
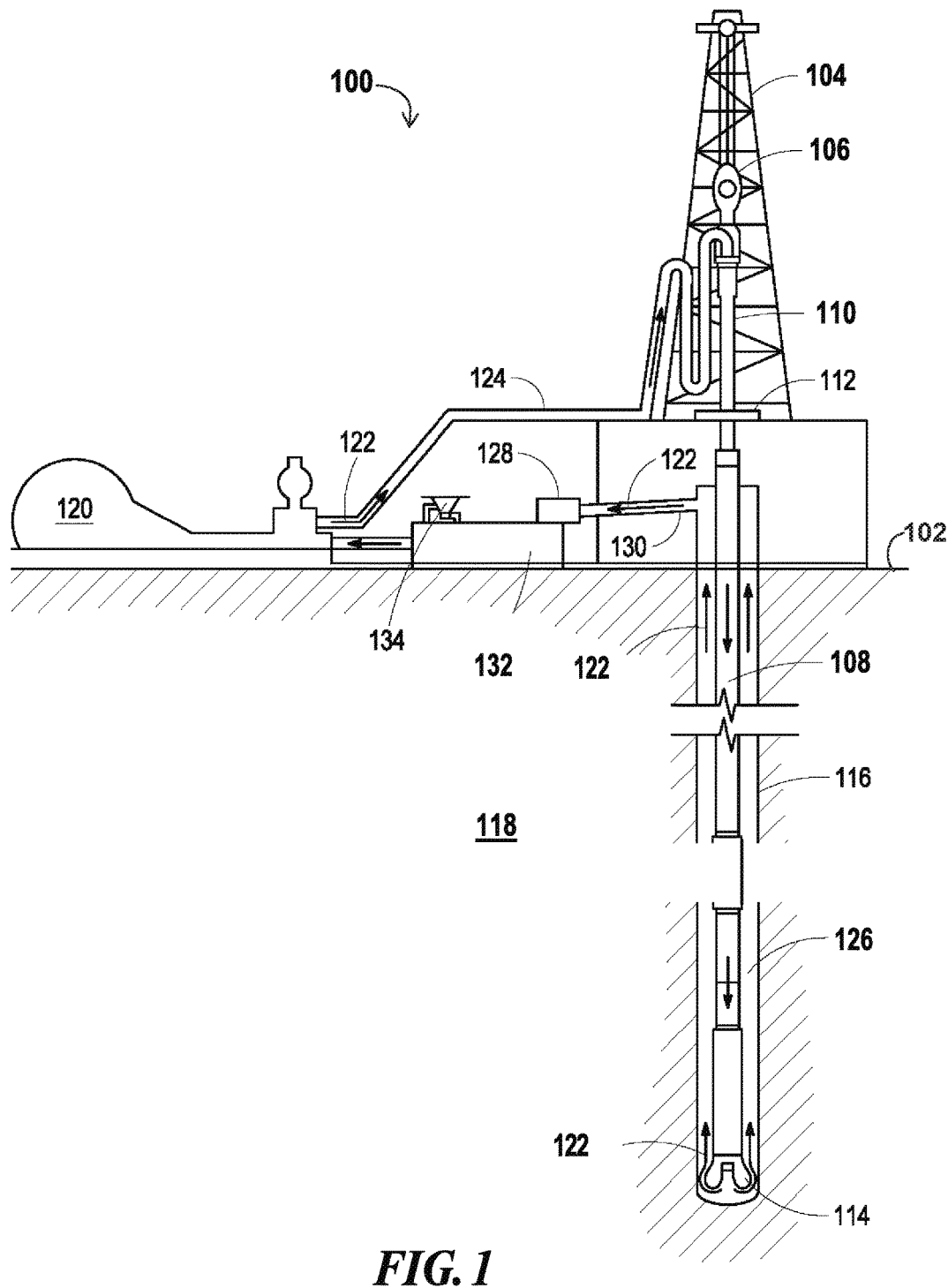
FIG. 1 illustrates a drilling assembly in accordance with various embodiments.

In satisfying the needs and others described above, the present invention provides metal organic frameworks (MOF) for use as a new category of proppant in fracking operations, such as in hydrocarbon wells.

Reference will now be made in detail to certain embodiments of the disclosed subject matter, examples of which are illustrated in part by the accompanying drawings. While the disclosed subject matter will be described in conjunction with the enumerated claims, it will be understood that the exemplified subject matter is not intended to limit the claims to the disclosed subject matter.

Definitions

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packing fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum-or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The term "shaped body" as used herein refers to any solid body that has at least a two-dimensional outer contour and extends to at least 0.2 mm in at least one direction in space. No other restrictions apply, i.e., the body may take any conceivable shape and may extend in any direction by any length so long as it extends to at least 0.2 mm in one direction.

Metal-Organic Framework

Some embodiments of the invention provide for a fluid composition and methods of its use, the composition comprising a metal-organic framework ("MOF"). The MOF is a bulk material, typically present as a crystalline microporous or mesoporous solid, and it comprises as basic or molecular units a plurality of metal ions and organic ligands that are at least bidentate, and the ligands are thereby capable of coordinating to the metal ions. MOFs generally exhibit high surface areas and are well-defined, rigid structures amenable to chemical and physical tuning by choice of metal and/or ligand. Repeated in two or three dimensions, the coordination of ligands to metals forms a lattice having pores, and the lattice thus constitutes the MOF structure.

Combinations of metal ions and ligands are very numerous and, hence, MOFs are versatile as to properties, size of pores, and applications. The invention contemplates in this regard the use of MOFs as proppants because MOFs can be manufactured into differently shaped bodies, as defined herein, they can be calcined, and they exhibit high mechanical strength while simultaneously maintaining porosity toward gases and liquids, even at high temperatures.

Suitable metals for use in the porous MOF of the invention are selected from metal ions of main group elements and of the subgroup elements of the periodic table of the elements, namely of the groups Ia, Ia, IIIa, IVa to VIIIa and Ib to VIb. Thus, in some embodiments, the metal is selected from the group consisting of components, particular reference is made to Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, Bi, Gd, Eu, Tb, and combinations thereof. Exemplary metals according to some embodiments include Zn, Cu, Ni, Co, Fe, Mn, Cr, Cd, Mg, Ca, Zr, and combinations thereof.

The MOF material according to some embodiments of the invention comprises metal ions of these metal elements. In principle, any available ion of a given metal is contemplated for use in the invention. Examples of metal ions include $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{2+}$, $Os^{2+}$, $Co^{2+}$, $Rh^{2+}$, $Rh^{3+}$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sn^+$, $Bi^{5+}$, $Bi^{3+}$ and $Bi^+$.

In principle any compound can be used as a ligand for this purpose and that fulfills the foregoing requirements. More specifically, the ligand features at least two centers that are capable coordinating to the metal ions of a metal salt, particularly with the metals of the aforementioned groups. In some embodiments, such centers in a ligand are selected from the group consisting of carboxylates, phosphonates, amines, azides, cyanides, squaryl groups, heteroatoms (e.g., N, O, and S), and combinations thereof.

In one embodiment, the ligand is selected from the group consisting of a monocarboxylic acid, a dicarboxylic acid, a tricarboxylic acid, a tetracarboxylic acid, and imidazole. Contemplated in this regard are ions, salts and combinations of such ligands. Illustrative ligands for use in the invention include formic acid, acetic acid, oxalic acid, propanoic acid, butanedioic acid, (E)-butenedioic acid, benzene-1,4-dicarboxylic acid, benzene-1,3-dicarboxylic acid, benzene-1,3,5-tricarboxylic acid, 2-amino-1,4-benzenedicarboxylic acid, 2-bromo-1,4-benzenedicarboxylic acid, biphenyl-4,4'-dicarboxylic acid, biphenyl-3,3',5,5'-tetracarboxylic acid, biphenyl-3,4',5-tricarboxylic acid, 2,5-dihydroxy-1,4-benzenedicarboxylic acid, 1,3,5-tris(4-carboxyphenyl)benzene, (2E, 4E)-hexa-2,4-dienedioic acid, 1,4-naphthalenedicarboxylic acid, pyrene-2,7-dicarboxylic acid, 4,5,9,10-tetrahydropyrene-2,7-dicarboxylic acid, aspartic acid, glutamic acid, adenine, 4,4'-bypiridine, pyrimidine, pyrazine, pyridine-4-carboxylic acid, pyridine-3-carboxylic acid, imidazole, 1H-benzimidazole, 2-methyl-1H-imidazole, ions, salts, and combinations thereof.

Some embodiments contemplate specific combinations of metal and ligand. For instance, in one embodiment the metal is Zn, i.e., the metal ion is $Zn^{2+}$, and the ligand is benzene-1,4-dicarboxylic acid, i.e, present as a dicarboxylate dianion coordinated to $Zn^{2+}$. In another embodiment, metal is Cu, i.e., the metal ion is $Cu^{2+}$, and the ligand is benzene-1,3,5-tricarboxylic acid., i.e., the corresponding tricarboxylate trianion.

Exemplary MOFs include those described in U.S. Pat. No. 5,648,508, EP-A-0 709 253, M. O'Keeffe et al., *J. Sol. State Chem.*, 152 (2000) p. 3-20, H. Li et al., *Nature* 402 (1999) p. 276 seq., M. Eddaoudi et al., *Topics in Catalysis* 9 (1999) p. 105-111, and B. Chen et al., *Science* 291 (2001) p. 1021-23. Specific examples of MOFs also include those based upon the following metal and ligand combinations:

$Zn_4O(BTE)(BPDC)$, where $BTE^{3-}$=4,4',4"-[benzene-1,3,5-triyl-tris (ethyne-2,1-diyl)]tribenzoate and $BPDC^{2-}$=biphenyl-4,4'-dicarboxylate (MOF-210), $Zn_4O(BBC)_2$, where $BBC^{3-}$=4,4',4"-[benzene-1,3,5-triyl-tris (benzene-4,1-diyl)]tribenzoate (MOF-200), $Zn_4O(BTB)_2$, where $BTB^{3-}$=1,3,5-benzenetribenzoate (MOF-177), $Zn_4O(BDC)_3$, where $BDC^{2-}$=1,4-benzenedicarboxylate (MOF-5), $Mn_3[(Mn_4Cl)_4(BTT)_8]_2$, where $H_3BTT$=benzene-1,3,5-tris(1H-tetrazole), $Cu_3(BTC)_2(H_2O)_3$, where $H_3BTC$=1,3,5-benzenetricarboxylic acid, and $Zr_6O_4(OH)_4(BDC)$ where $BDC^{2-}$=1,4-benzenedicarboxylate (UiO-66).

One advantage of the invention resides in the fact that MOFs typically are crystalline solids exhibiting low density, thereby rendering them amenable to suspension in fluids for ease of delivery to subterranean formations. Thus in some embodiments, the MOF has a dry density of about 0.2 g/cm$^3$ to about 0.8 g/cm$^3$. Consistent with this physical property, as mentioned above, MOFs according to the invention are porous materials, wherein pore sizes are tunable by judicious selection of metal and ligand. In one embodiment, the pore size of the MOF ranges from about 0.2 nm to about 30 nm, from about 0.5 nm to about 20 nm, and from about 0.7 nm to about 2 nm.

According to one embodiment of the invention, the MOF is present as a shaped body, as defined herein. The shaped body is a macroscopic shape that the MOF assumes. Because different shapes are possible with manufacturing techniques, a variety of shapes and sizes of MOFs can be deployed for use a proppant. Hence, in one embodiment, the shaped body has a shortest dimension of at least about 0.2 mm and a longest dimension of about 3 mm. Within these general guidelines, according to other embodiments, the shaped body is selected from the group consisting of a spherical body, a cylindrical body, a disk-shaped pellet, and combinations thereof. An illustrative shaped body is a spherical pellet.

Method of treating a subterranean formation

One embodiment of the present invention is a method of treating a subterranean formation, comprising contacting the formation with the composition described herein. In some embodiments, the composition is used in well completion operations, such as primary proppant treatments for immobilizing proppant particulates (e.g., hydraulic fracturing, gravel packing, and frac-packing), remedial proppant/gravel treatments, near-wellbore formation sand consolidation treatments for sand control, consolidating-while-drilling target intervals, and plugging-and-abandonment of wellbores in subterranean formations.

Per another embodiment, the method further includes placing the composition in a subterranean formation. The placing of the composition in the subterranean formation can include contacting the composition and any suitable part of the subterranean formation, or contacting the composition and a subterranean material, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The placing of the composition in the subterranean formation can include at least partially depositing the composition in a fracture, flow pathway, or area surrounding the same.

In still another embodiment, the method further comprises hydraulic fracturing, such as a method of hydraulic fracturing to generate a fracture or flow pathway. The placing of the composition in the subterranean formation or the contacting of the subterranean formation and the hydraulic fracturing can occur at any time with respect to one another; for example, the hydraulic fracturing occurs before, during, and/or after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway.

In one embodiment, the fluid composition comprises a carrier fluid. Any suitable proportion of the composition can be one or more downhole fluids or one or more carrier fluids. In some embodiments about 0.001 wt % to about 99.999 wt % of the composition is a downhole fluid or carrier liquid, or about 0.1 wt % to about 80 wt %, or about 1 wt % to about 50 wt %, or about 1 wt % or more of the composition, or about 2 wt %, 3, 4, 5, 10, 15, 20, 25, 30, 40, 50, 60, 70, 80, 85, 90, 91, 92, 93, 94, 95, 96, 97, 98, 99, 99.9, or about 99.99 wt % or more.

In accordance with another embodiment, the concentration of MOF in the composition varies from about 0.01 wt % to about 30 wt %. In one embodiment, the concentration is about 0.1 wt % to about 10 wt %.

Other Components

In some embodiments, the composition comprises one or more surfactants. The surfactant facilitates the coating of the MOF on a subterranean surface causing the MOF composition to flow into fractures and/or flow channels within the subterranean formation. The surfactant is any suitable surfactant, such that the composition can be used as described herein. The surfactant is present in any suitable proportion of the composition, such that the composition can be used as described herein. For example, about 0.000,1 wt % to about 20 wt % of the composition constitutes one or more surfactants, about 0.001 wt % to about 1 wt %, or about 0.000,1 wt % or less, or about 0.001 wt %, 0.005, 0.01, 0.02, 0.04, 0.06, 0.08, 0.1, 0.2, 0.3, 0.4, 0.5, 0.6, 0.8, 1, 2, 3, 4, 5, 6, 7, 8, 9, 10, 11, 12, 13, 14, 15, 16, 17, 18, 19, or about 20 wt % or more.

In some embodiments, the surfactant is at least one of a cationic surfactant, an anionic surfactant, and a non-ionic surfactant. In some embodiments, the ionic groups of the surfactant can include counterions, such that the overall charge of the ionic groups is neutral, whereas in other embodiments, no counterion can be present for one or more ionic groups, such that the overall charge of the one or more ionic groups is not neutral.

In one embodiment, the surfactant is a non-ionic surfactant. Examples of non-ionic surfactants include polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, polyoxyalkylene glycol modified polysiloxane surfactants, and mixtures, copolymers or reaction products thereof. For example, the surfactant is polyglycol-modified trimethylsilylated silicate surfactant. Further examples of non-ionic surfactants include, but are not limited to, condensates of ethylene oxide with long chain fatty alcohols or fatty acids such as a $(C_{12-16})$alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, fatty amine oxides, polyoxyalkylene alkyl ethers such as polyethylene glycol long chain alkyl ether, polyoxyalkylene sorbitan ethers, polyoxyalkylene alkoxylate esters, polyoxyalkylene alkylphenol ethers, ethylene glycol propylene glycol copolymers and alkylpolysaccharides, polymeric surfactants such as polyvinyl alcohol (PVA) and polyvinylmethylether. In some embodiments, the surfactant is a polyoxyethylene fatty alcohol or mixture of polyoxyethylene fatty alcohols. In other embodiments, the surfactant is an aqueous dispersion of a polyoxyethylene fatty alcohol or mixture of polyoxyethylene fatty alcohols. In some examples, suitable non-ionic surfactants include at least one of an alkyl polyglycoside, a sorbitan ester, a methyl glucoside ester, an amine ethoxylate, a diamine ethoxylate, a polyglycerol ester, an alkyl ethoxylate, an alcohol that has been polypropoxylated and/or polyethoxylated, any derivative thereof, or any combination thereof.

Examples of anionic surfactants include, but are not limited to, alkyl sulphates such as lauryl sulphate, polymers such as acrylates/$C_{10-30}$ alkyl acrylate crosspolymer alkylbenzenesulfonic acids and salts such as hexylbenzenesulfonic acid, octylbenzenesulfonic acid, decylbenzenesulfonic acid, dodecylbenzenesulfonic acid, cetylbenzenesulfonic acid and myristylbenzenesulfonic acid; the sulphate esters of monoalkyl polyoxyethylene ethers; alkylnapthylsulfonic acid; alkali metal sulfoccinates, sulfonated glyceryl esters of fatty acids such as sulfonated monoglycerides of coconut oil acids, salts of sulfonated monovalent alcohol esters, amides of amino sulfonic acids, sulfonated products of fatty acid nitriles, sulfonated aromatic hydrocarbons, condensation products of naphthalene sulfonic acids with formaldehyde, sodium octahydroanthracene sulfonate, alkali metal alkyl sulphates, ester sulphates, and alkarylsulfonates. Anionic surfactants include alkali metal soaps of higher fatty acids, alkylaryl sulfonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, and alkyl sarcosinates.

Suitable cationic surfactants include at least one of an arginine methyl ester, an alkanolamine, an alkylenediamide, an alkyl ester sulfonate, an alkyl ether sulfonate, an alkyl ether sulfate, an alkali metal alkyl sulfate, an alkyl or alkylaryl sulfonate, a sulfosuccinate, an alkyl or alkylaryl disulfonate, an alkyl disulfate, an alcohol polypropoxylated or polyethoxylated sulfates, a taurate, an amine oxide, an alkylamine oxide, an ethoxylated amide, an alkoxylated fatty acid, an alkoxylated alcohol, an ethoxylated fatty amine, an ethoxylated alkyl amine, a betaine, a modified betaine, an alkylamidobetaine, a quaternary ammonium compound, any derivative thereof, and any combination thereof. Examples of suitable cationic surfactants can include quaternary ammonium hydroxides such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide and coco trimethyl ammonium hydroxide as well as corresponding salts of these materials, fatty amines and fatty acid amides and their derivatives, basic pyridinium compounds, and quaternary ammonium bases of benzimidazolines and poly(ethoxylated/propoxylated) amines.

In some embodiments, the surfactant is selected from Tergitol™ 15-s-3, Tergitol™ 15-s-40, sorbitan monooleate, polyglycol-modified trimethsilylated silicate, polyglycol-modified siloxanes, polyglycol-modified silicas, ethoxylated quaternary ammonium salt solutions, cetyltrimethylammonium chloride or bromide solutions, an ethoxylated nonyl phenol phosphate ester, and a $(C_{12}-C_{22})$alkyl phosphonate. In some examples, the surfactant is a sulfonate methyl ester, a hydrolyzed keratin, a polyoxyethylene sorbitan monopalmitate, a polyoxyethylene sorbitan monostearate, a polyoxyethylene sorbitan monooleate, a linear alcohol alkoxylate, an alkyl ether sulfate, dodecylbenzene sulfonic acid, a linear nonyl-phenol, dioxane, ethylene oxide, polyethylene glycol, an ethoxylated castor oil, dipalmitoyl-phosphatidylcholine, sodium 4-(1' heptylnonyl)benzenesulfonate, polyoxyethylene nonyl phenyl ether, sodium dioctyl sulphosuccinate, tetraethyleneglycoldodecylether, sodium octylbenzenesulfonate, sodium hexadecyl sulfate, sodium laureth sulfate, decylamine oxide, dodecylamine betaine, dodecylamine oxide, N,N,N-trimethyl-1-octadecammonium chloride, xylenesulfonate and salts thereof (e.g., sodium xylene sulfonate), sodium dodecyl sulfate, cetyltrimethyl-ammonium bromide, any derivative thereof, or any combination thereof.

In other embodiments, the surfactant is one of alkyl propoxy-ethoxysulfonate, alkyl propoxy-ethoxysulfate, alkylaryl-propoxy-ethoxysulfonate, a mixture of an ammonium salt of an alkyl ether sulfate, cocoamidopropyl betaine, cocoamidopropyl dimethylamine oxide, an ethoxylated alcohol ether sulfate, an alkyl or alkene amidopropyl betaine, an alkyl or alkene dimethylamine oxide, an alpha-olefinic sulfonate surfactant, any derivative thereof, and any combination thereof. Suitable surfactants also include polymeric surfactants, block copolymer surfactants, di-block polymer surfactants, hydrophobically modified surfactants, fluoro-surfactants, and surfactants containing a non-ionic spacer-arm central extension and an ionic or nonionic polar group. In some examples, the non-ionic spacer-arm central extension is the result of at least one of polypropoxylation and polyethoxylation.

In various embodiments, the surfactant is at least one of a substituted or unsubstituted $(C_5-C_{50})$hydrocarbylsulfate salt, a substituted or unsubstituted $(C_5-C_{50})$hydrocarbylsulfate $(C_1-C_{20})$hydrocarbyl ester wherein the $(C_1-C_{20})$hydrocarbyl is substituted or unsubstituted, and a substituted or unsubstituted $(C_5-C_{50})$hydrocarbylbisulfate. The surfactant is at least one of a $(C_5-C_{20})$alkylsulfate salt, a $(C_5-C_{20})$ alkylsulfate $(C_1-C_{20})$alkyl ester and a $(C_5-C_{20})$alkylbisulfate. In various embodiments the surfactant is a $(C_8-C_{15})$ alkylsulfate salt, wherein the counterion is any suitable counterion, such as $Na^+$, $K^+$, $Li^+$, $H^+$, $Zn^+$, $NH_4^+$, $Ca^{2+}$, $Mg^{2+}$, $Zn^{2+}$, or $Al^{3+}$. In some embodiments, the surfactant is a $(C_8-C_{15})$ alkylsulfate salt sodium salt. In some embodiments, the surfactant is sodium dodecyl sulfate.

In various embodiments, the surfactant is a $(C_5-C_{50})$ hydrocarbyltri$((C_1-C_{50})$ hydrocarbyl)ammonium salt, wherein each $(C_5-C_{50})$hydrocarbyl is independently selected. The counterion can be any suitable counterion, such as $Na^+$, $K^+$, $Li^+$, $H^+$, $Zn^+$, $NH_4^+$, $Ca^{2+}$, $Mg^{2+}$, $Zn^{2+}$, or $Al^{3+}$. Alternatively, the surfactant is a $(C_5-C_{50})$ alkyltri $((C_1-C_{20})$ alkyl)ammonium salt, wherein each $(C_5-C_{50})$alkyl is independently selected. For instance, the surfactant is a $(C_{10}-C_{30})$alkyltri $((C_1-C_{10})$alkyl) ammonium halide salt, wherein each ($C_{10}$-$C_{30}$) alkyl is independently selected. An exemplary surfactant is cetyltrimethylammonium bromide.

In some embodiments, the composition further comprises include a hydrolyzable ester. The hydrolyzable ester is any suitable hydrolyzable ester. For example, the hydrolyzable ester is a $C_1$-$C_5$ mono-, di-, tri-, or tetra-alkyl ester of a $C_2$-$C_{40}$ mono-, di-, tri-, or tetra-carboxylic acid. The hydrolyzable ester is one of dimethylglutarate, dimethyladipate, dimethylsuccinate, sorbitol, catechol, dimethylthiolate, methyl salicylate, dimethylsalicylate, and tert-butylhydroperoxide. Any suitable wt % of the composition or a cured product thereof is the hydrolyzable ester, such as about 0.01 wt % to about 20 wt %, or about 0.1 wt % to about 5 wt %, or about 0.01 wt % or less, or about 0.1 wt %, 1, 2, 3, 4, 5, 6, 8, 10, 12, 14, 16, 18, or about 20 wt % or more.

In other embodiments, the composition comprises at least one tackifier. The tackifier can be any suitable wt % of the composition or cured product thereof, such as about 0.001 wt % to about 50 wt %, about 0.01 wt % to about 30 wt %, or about 0.001 wt % or less, or about 0.01 wt %, 0.1, 1, 2, 3, 4, 5, 10, 15, 20, 25, 30, 35, 40, 45, or about 50 wt % or more. The tackifier is any suitable material having tackiness. For example, the tackifier is an adhesive or a resin. The term "resin" as used herein refers to any of numerous physically similar polymerized synthetics or chemically modified natural resins including thermoplastic materials and thermosetting materials. In some embodiments, the tackifier is at least one of a shellac, a polyamide, a silyl-modified polyamide, a polyester, a polycarbonate, a polycarbamate, a urethane, a natural resin, an epoxy-based resin, a furan-based resin, a phenolic-based resin, a urea-aldehyde resin, and a phenol/phenol formaldehyde/furfuryl alcohol resin.

In some embodiments, the tackifier is one of bisphenol A diglycidyl ether resin, butoxymethyl butyl glycidyl ether resin, bisphenol A-epichlorohydrin resin, and bisphenol F resin. In other embodiments, the tackifier is one of an acrylic acid polymer, an acrylic acid ester polymer, an acrylic acid homopolymer, an acrylic acid ester homopolymer, poly(methyl acrylate), poly(butyl acrylate), poly(2-ethylhexyl acrylate), an acrylic acid ester copolymer, a methacrylic acid derivative polymer, a methacrylic acid homopolymer, a methacrylic acid ester homopolymer, poly(methyl methacrylate), poly(butyl methacrylate), poly(2-ethylhexyl methacrylate), an acrylamidomethylpropane sulfonate polymer or copolymer or derivative thereof, and an acrylic acid/acrylamidomethylpropane sulfonate copolymer. In still other embodiments, the tackifier is a trimer acid, a fatty acid, a fatty acid-derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, and a condensation reaction product of a polyacid and a polyamine.

In some embodiments, the tackifier includes an amine-containing polymer and/or is hydrophobically-modified. In some embodiments, the tackifier includes one of a polyamine (e.g., spermidine and spermine), a polyimine (e.g., poly(ethylene imine) and poly(propylene imine)), a polyamide, poly(2-(N,N-dimethylamino)ethyl methacrylate), poly(2-(N,N-diethylamino)ethyl methacrylate), poly(vinyl imidazole), and a copolymer including monomers of at least one of the foregoing and monomers of at least one non-amine-containing polymer such as of at least one of polyethylene, polypropylene, polyethylene oxide, polypropylene oxide, polyvinylpyridine, polyacrylic acid, polyacrylate, and polymethacrylate. The hydrophobic modification is any suitable hydrophobic modification, such as at least one $C_4$-$C_{30}$ hydrocarbyl including at least one of a straight chain, a branched chain, an unsaturated C-C bond, an aryl group, and any combination thereof.

One advantage of the MOF composition described herein is that dry density of the MOF proppant is relatively low such the fluid composition typically can be of low viscosity for effective transportation of the composition to, and contacting it with a subterranean surface. In some embodiments where viscosity is modified, however, the composition includes one or more viscosifiers. The viscosifier is any suitable viscosifier. The viscosifier provides an increased viscosity of the composition before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000,1 wt % to about 10 wt % of the composition or a cured product thereof, about 0.004 wt % to about 0.01 wt %, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt % or more.

The viscosifier includes at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. Exemplary viscosifiers include a polymer including at least one monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$)alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, welan, derivatized starch, tamarind, tragacanth, guar gum, derivatized guar (e.g., hydroxypropyl guar, carboxy methyl guar, or carboxymethyl hydroxypropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier is at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C-C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N-($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly(vinylalcohol/2-acrylamido-2-methylpropanesulfonic acid) copolymer, a poly (acrylamide/2-acrylamido-2-methylpropanesulfonic acid) copolymer, or a poly (vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In some embodiments, the composition comprises one or more breakers. The breaker is any suitable breaker, such that the surrounding fluid (e.g., a fracturing fluid) is at least partially broken for more complete and more efficient recovery thereof, such as at the conclusion of the hydraulic fracturing treatment. In some embodiments, the breaker is encapsulated or otherwise formulated to give a delayed-release or a time-release breaker, such that the surrounding liquid remains viscous for a suitable amount of time prior to breaking. The breaker is any suitable breaker; such as a compound that includes a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker is at least one of a $Na^+$, $K^+$, $Li^+$, $Zn^+$, $NH_4^+$, $Fe^{2+}$, $Fe^{3+}$, $Cu^{1+}$, $Cu^{2+}$, , $Ca^{2+}$, $Mg^{2+}$, $An^{2+}$, and an $Al^{3+}$ salt of a persulfate, percarbonate, perborate, peroxide, perphosphate, permanganate, chlorite, or hyperchlorite ion. An enzymatic breaker is at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the composition, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

In accordance with one embodiment, the composition comprises any suitable fluid in addition to those otherwise described herein. For example, the fluid is at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid constitutes about 0.001 wt % to about 99.999 wt % of the composition or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In other embodiments, the composition comprises a downhole fluid. The composition can be combined with any suitable downhole fluid before, during, or after the placement of the composition in the subterranean formation or the contacting of the composition and the subterranean material. In some examples, the composition is combined with a downhole fluid above the surface, and then the combined composition is placed in a subterranean formation or contacted with a subterranean material. In another example, the composition is injected into a subterranean formation to combine with a downhole fluid, and the combined composition is contacted with a subterranean material or is considered to be placed in the subterranean formation.

In some embodiments, the downhole fluid is an aqueous or oil-based fluid including a fracturing fluid, spotting fluid, clean-up fluid, completion fluid, remedial treatment fluid, abandonment fluid, pill, cementing fluid, packer fluid, or a combination thereof. The placement of the composition in the subterranean formation can include contacting the subterranean material and the mixture. The downhole fluid constitutes any suitable weight percent of the composition, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt %.

In some embodiments, the composition includes an amount of any suitable material used in a downhole fluid. For example, the composition includes water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, pozzolan lime, or a combination thereof.

In still other embodiments, the composition includes one or more additive components such as: thinner additives such as COLDTROL®, ATC®, OMC 2™, and OMC 42™; RHEMOD™, a viscosifier and suspension agent including a modified fatty acid; additives for providing temporary increased viscosity, such as for shipping (e.g., transport to the well site) and for use in sweeps (for example, additives having the trade name TEMPERUS™ (a modified fatty acid) and VIS-PLUS®, a thixotropic viscosifying polymer blend); TAU-MOD™, a viscosifying/suspension agent including an amorphous/fibrous material; additives for filtration control, for example, ADAPTA®, a high temperature high pressure (HTHP) filtration control agent including a crosslinked copolymer; DURATONE® HT, a filtration control agent that includes an organophilic lignite, more particularly organophilic leonardite; THERMO TONE™, a HTHP filtration control agent including a synthetic polymer; BDF™-366, a HTHP filtration control agent; BDF™-454, a HTHP filtration control agent; LIQUITONE™, a polymeric filtration agent and viscosifier; additives for HTHP emulsion stability, for example, FACTANT™, which includes highly concentrated tall oil derivative; emulsifiers such as LE SUPERMUL™ and EZ MUL® NT, polyaminated fatty acid emulsifiers, and FORTI-MUL®; DRIL TREAT®, an oil wetting agent for heavy fluids; BARACARB®, a sized ground marble bridging agent; BAROID®, a ground barium sulfate weighting agent; BAROLIFT®, a hole sweeping agent; SWEEP-WATE®, a sweep weighting agent; BDF-508, a diamine dimer rheology modifier; GELTONE® II organophilic clay; BAROFIBRE™ O for lost circulation management and seepage loss prevention, including a natural cellulose fiber; STEELSEAL®, a resilient graphitic carbon lost circulation material; HYDRO-PLUG®, a hydratable swelling lost circulation material; lime, which can provide alkalinity and can activate certain emulsifiers; and calcium chloride, which can provide salinity. Any suitable proportion of the composition can include any optional component described hereinabove, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more.

A cement fluid includes an aqueous mixture cement and/or cement kiln dust. The composition including the aryl component and the amine or epoxide component, or a cured product thereof, can form a useful combination with cement or cement kiln dust. The cement kiln dust is any suitable cement kiln dust. Cement kiln dust is formed during the manufacture of cement and can be partially calcined kiln feed that is removed from the gas stream and collected in a dust collector during a manufacturing process. Cement kiln dust is advantageously utilized in a cost-effective manner since kiln dust is often regarded as a low value waste product of the cement industry. Some embodiments of the cement fluid include cement kiln dust but no cement, cement kiln dust and cement, or cement but no cement kiln dust. The cement is any suitable cement. The cement can be a hydraulic cement, for instance. A variety of cements can be utilized in accordance with embodiments of the present invention; for example, those including calcium, aluminum, silicon, oxygen, iron, or sulfur, which can set and harden by reaction with water. Other suitable cements include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives are added to a cement or kiln dust-containing composition of embodiments of the present invention as deemed appropriate by one skilled in the art, with the benefit of this disclosure. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives include crystalline silica compounds, amorphous silica, salts, fibers, hydratable clays, microspheres, pozzolan lime, thixotropic additives, and combinations thereof.

In accordance with another embodiment, the composition described herein comprises a binder. A binder is useful, for instance, in the formation of shaped bodies of the MOF composition, as described above. For instance, the binder is selected from the group consisting of hydrated aluminum-containing binders, titanium dioxide, hydrated titanium dioxide, clay minerals, alkoxysilanes, amphiphilic substances, graphite, and combinations thereof. Further examples of suitable binders include hydrated alumina or other aluminum-containing binders, mixtures of silicon and aluminum compounds such as disclosed in WO 94/13584); and silicon compounds.

Still further examples binders suitable for use in the invention include oxides of silicon, aluminum, boron, phosphorus, zirconium, and/or titanium. An illustrative binder, according to one embodiment, is silica, where the $SiO_2$ subunit is introduced into a shaping step as a silica sol or in the form of tetraalkoxysilanes, such in the formation of the shaped bodies described herein. Still further examples of binders include oxides of magnesium and of beryllium and clays, such as montmorillonites, kaolins, bentonites, halloysites, dickites, nacrites and anauxites. Tetraalkoxysilanes also are suitable for use as binders in the present invention. Specific examples include tetramethoxysilane, tetraethoxysilane, tetrapropoxysilane and tetrabutoxysilane. Tetraalkoxytitanium and tetraalkoxyzirconium compounds and trimethoxy-, triethoxy-, tripropoxy- and tributoxy-aluminum, tetramethoxysilane and tetraethoxysilane are still further examples of suitable binders.

System

In accordance with an embodiment, the invention provides a system that uses or that can be generated by use of an embodiment of the composition described herein in a subterranean formation, or that can perform or be generated by performance of a method for using the composition described herein. For instance, the system includes a composition and a subterranean formation including the composition therein. In some embodiments, the composition in the system includes a downhole fluid, or the system comprises a mixture of the composition and downhole fluid. In other embodiments, the system comprises a tubular and a pump configured to pump the composition into the subterranean formation through the tubular.

Some embodiments provide a system configured for delivering the composition described herein to a subterranean location and for using the composition therein, such as for a fracturing operation (e.g., pre-pad, pad, slurry, or finishing stages). In some embodiments, the system or apparatus includes a pump fluidly coupled to a tubular (e.g., any suitable type of oilfield pipe, such as pipeline, drill pipe, production tubing, and the like), the tubular containing a composition as described herein.

In some embodiments, the system comprises a drillstring disposed in a wellbore, the drillstring including a drill bit at a downhole end of the drillstring. The system can also include an annulus between the drillstring and the wellbore. Further, in accordance with one embodiment, the system includes a pump configured to circulate the composition through the drill string, through the drill bit, and back above-surface through the annulus. In some embodiments, the system includes a fluid processing unit configured to process the composition exiting the annulus to generate a cleaned drilling fluid for recirculation through the wellbore.

The pump is a high pressure pump in some embodiments. As used herein, the term "high pressure pump" refers to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps are known to one having ordinary skill in the art and can include floating piston pumps and positive displacement pumps.

In other embodiments, the pump is a low pressure pump. As used herein, the term "low pressure pump" refers to a pump that operates at a pressure of about 1000 psi or less. In some embodiments, a low pressure pump can be fluidly coupled to a high pressure pump that is fluidly coupled to the tubular. That is, in such embodiments, the low pressure pump is configured to convey the composition to the high pressure pump. In such embodiments, the low pressure pump can "step up" the pressure of the composition before it reaches the high pressure pump.

In some embodiments, the system described herein further includes a mixing tank that is upstream of the pump and in which the composition is formulated. In various embodiments, the pump (e.g., a low pressure pump, a high pressure pump, or a combination thereof) conveys the composition from the mixing tank or other source of the composition to the tubular. In other embodiments, however, the composition e formulated offsite and transported to a worksite, in which case the composition is introduced to the tubular via the pump directly from its shipping container (e.g., a truck, a railcar, a barge, or the like) or from a transport pipeline. In either case, the composition is drawn into the pump, elevated to an appropriate pressure, and then introduced into the tubular for delivery to the subterranean formation.

With reference to FIG. 1, the composition directly or indirectly affects one or more components or pieces of equipment associated with a wellbore drilling assembly 100, according to one or more embodiments. While FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

The composition may be added to, among other things, a drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the composition is added to, among other things, a drilling fluid 122 at any other location in the drilling assembly 100. In at least one embodiment, for example, there is more than one retention pit 132, such as multiple retention pits 132 in series. Moreover, the retention pit 132 can represent one or more fluid storage facilities and/or units where the composition may be stored, reconditioned, and/or regulated until added to a drilling fluid 122.

As mentioned above, the composition may directly or indirectly affect the components and equipment of the drilling assembly 100. For example, the composition may directly or indirectly affect the fluid processing unit(s) 128, which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the composition.

The composition may directly or indirectly affect the pump 120, which is intended to represent one or more of any conduits, pipelines, trucks, tubulars, and/or pipes used to fluidically convey the composition downhole, any pumps, compressors, or motors (e.g., topside or downhole) used to drive the composition into motion, any valves or related joints used to regulate the pressure or flow rate of the composition, and any sensors (e.g., pressure, temperature, flow rate, and the like), gauges, and/or combinations thereof, and the like. The composition may also directly or indirectly affect the mixing hopper 134 and the retention pit 132 and their assorted variations.

The composition can also directly or indirectly affect various downhole equipment and tools that comes into contact with the composition such as, but not limited to, the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The composition may also directly or indirectly affect any downhole heat exchangers, valves and corresponding actuation devices, tool seals, packers and other wellbore isolation devices or components, and the like associated with the wellbore 116.

While not specifically illustrated herein, the composition may also directly or indirectly affect any transport or delivery equipment used to convey the composition to the drilling assembly 100 such as, for example, any transport vessels, conduits, pipelines, trucks, tubulars, and/or pipes used to fluidically move the composition from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

Figure 2:
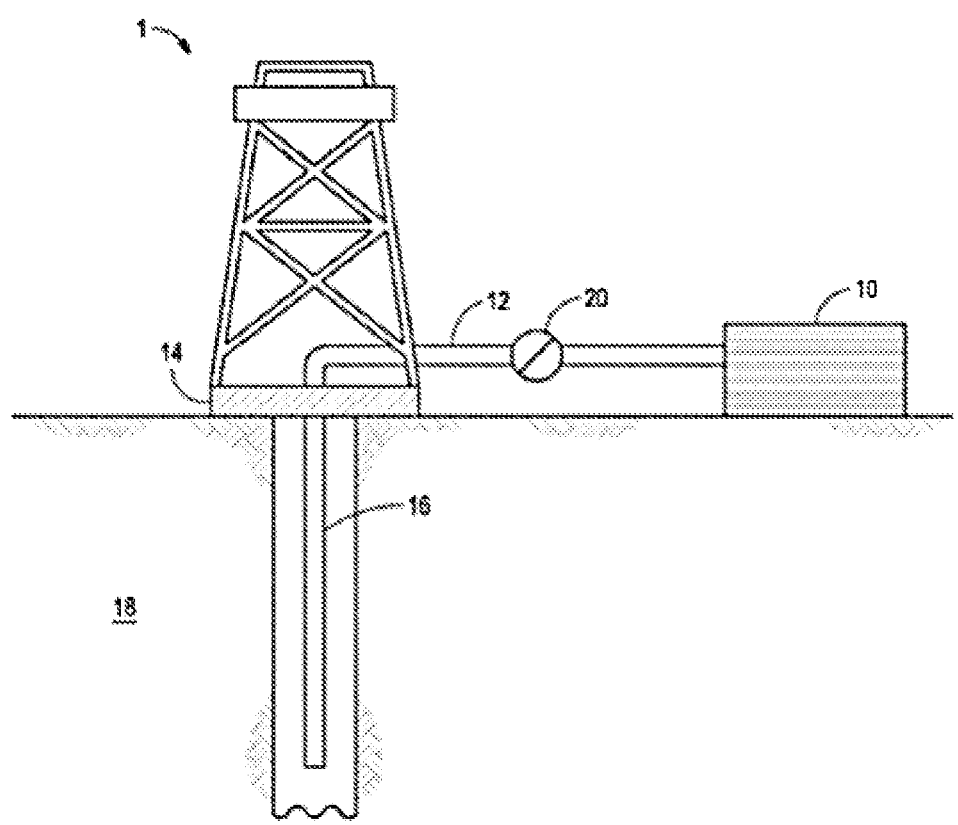
FIG. 2 illustrates a system for delivering a composition to a subterranean formation in accordance with various embodiments.

FIG. 2 shows an illustrative schematic of systems that can deliver embodiments of the compositions of the present invention to a subterranean location, according to one or more embodiments. It should be noted that while FIG. 2 generally depicts a land-based system or apparatus, like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the composition can, in some embodiments, flow back to wellhead 14 and exit subterranean formation 18. The composition that flows back can be substantially diminished in the concentration of various components therein. In some embodiments, the composition that has flowed back to wellhead 14 can subsequently be recovered, and in some examples reformulated, and recirculated to subterranean formation 18.

The composition of the invention can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Additional Embodiments

The following exemplary embodiments are provided, the numbering of which is not to be construed as designating levels of importance:

Embodiment 1 is a method of treating a subterranean formation, the method comprising contacting the formation with a fluid composition comprising a metal-organic framework comprised of at least one metal ion and an organic ligand that is at least bidentate and that is bonded to the metal ion.

Embodiment 2 relates to embodiment 1, wherein the metal ion is selected from available ions of base elements in the group consisting of Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, Bi, Gd, Eu, Tb, and combinations thereof.

Embodiment 3 relates to embodiment 2, wherein the base element is selected from the group consisting of Zn, Cu, Ni, Co, Fe, Mn, Cr, Cd, Mg, Ca, Zr, and combinations thereof.

Embodiment 4 relates to any of embodiments 1-3, wherein the ligand contains at least one functional group selected from the group consisting of a carboxylate, a phosphonate, an amine, an azide, a cyanide, a squaryl, an heteroatom, and combinations thereof.

Embodiment 5 relates to any of embodiments 1-4, wherein the ligand is selected from the group consisting of a monocarboxylic acid, a dicarboxylic acid, a tricarboxylic acid, a tetracarboxylic acid, imidazole, ions, salts and combinations thereof.

Embodiment 6 relates to any of embodiments 1-5, wherein the ligand is selected from the group consisting of formic acid, acetic acid, oxalic acid, propanoic acid, butanedioic acid, (E)-butenedioic acid, benzene-1,4-dicarboxylic acid, benzene-1,3-dicarboxylic acid, benzene-1,3,5-tricarboxylic acid, 2-amino-1,4-benzenedicarboxylic acid, 2-bromo-1,4-benzenedicarboxylic acid, biphenyl-4,4'-dicarboxylic acid, biphenyl-3,3',5,5?-tetracarboxylic acid, biphenyl-3,4',5-tricarboxylic acid, 2,5-dihydroxy-1,4-benzenedicarboxylic acid, 1,3,5-tris(4-carboxyphenyl)benzene, (2E, 4E)-hexa-2,4-dienedioic acid, 1,4-naphthalenedicarboxylic acid, pyrene-2,7-dicarboxylic acid, 4,5,9,10-tetrahydropyrene-2,7-dicarboxylic acid, aspartic acid, glutamic acid, adenine, 4,4'-bypiridine, pyrimidine, pyrazine, pyridine-4-carboxylic acid, pyridine-3-carboxylic acid, imidazole, 1H-benzimidazole, 2-methyl-1H-imidazole, ions, salts, and combinations thereof.

Embodiment 7 relates to any of embodiments 1-6, wherein the metal ion is an ion of Zn and the ligand is benzene-1,4-dicarboxylic acid.

Embodiment 8 relates to any of embodiments 1-7, wherein the metal ion is an ion of Cu and the ligand is benzene-1,3,5-tricarboxylic acid.

Embodiment 9 relates to any of embodiments 1-8, wherein the metal-organic framework has a dry density of about 0.2 g/cm$^3$ to about 0.8 g/cm$^3$.

Embodiment 10 relates to any of embodiments 1-9, wherein the metal-organic framework has a pore size from about 0.2 nm to about 30 nm.

Embodiment 11 relates to any of embodiments 1-10, wherein the metal-organic framework is present in the form of a shaped body having a shortest dimension of at least about 0.2 mm and a longest dimension of about 3 mm.

Embodiment 12 relates to 11, wherein the shaped body is selected from the group consisting of a spherical body, a cylindrical body, a disk-shaped pellet, and combinations thereof.

Embodiment 13 relates to any of embodiments 1-12, wherein the composition further comprises a binder.

Embodiment 14 relates to embodiment 13, wherein the binder is selected from the group consisting of hydrated aluminum-containing binders, titanium dioxide, hydrated titanium dioxide, clay minerals, alkoxysilanes, amphiphilic substances, graphite, and combinations thereof.

Embodiment 15 relates to any of embodiments 1-14, wherein the contacting comprises placing the composition in at least one of a fracture and flowpath in the subterranean formation.

Embodiment 16 relates embodiment 15, wherein the fracture is present in the subterranean formation at the time when the composition is contacted with the subterranean formation.

Embodiment 17 relates to any of embodiment 16, wherein the method further comprises forming the fracture or flowpath.

Embodiment 18 relates to any of embodiments 1-17, wherein the contacting comprises gravel packing.

Embodiment 19 relates to any of embodiments 1-18, further comprising fracturing the subterranean formation to form at least one fracture in the subterranean formation.

Embodiment 20 relates to any of embodiments 1-19, wherein the composition further comprises a carrier fluid.

Embodiment 21 relates to any of embodiments 1-20, wherein the metal-organic framework is present in an amount of about 0.01 wt % to about 30 wt % based upon the total weight of the composition.

Embodiment 22 relates to any of embodiments 1-21, wherein the metal-organic framework is present in an amount of about 0.1 wt % to about 10 wt %.

Embodiment 23 relates to any of embodiments 1-22, further comprising combining the composition with an aqueous or oil-based fluid comprising a fracturing fluid, spotting fluid, clean-up fluid, completion fluid, remedial treatment fluid, abandonment fluid, pill, cementing fluid, packer fluid, or a combination thereof Embodiment 24 is a system for performing the method of any of embodiments 1-23, the system comprising a tubular disposed in the subterranean formation; and a pump configured to pump the composition in the subterranean formation through the tubular.

Embodiment 25 is a system comprising a fluid composition comprising a metal-organic framework comprised of at least one metal ion and an organic ligand that is at least bidentate and that is bonded to the metal ion subterranean formation comprising the composition therein.

Embodiment 26 relates to embodiment 25, further comprising a tubular disposed in the subterranean formation and a pump configured to pump the composition in the subterranean formation through the tubular.

We claim:

1. A method of treating a subterranean formation the method comprising:
    contacting the formation with a fluid composition, the fluid composition comprises
        0.01 to about 30 wt % based on the total weight of the fluid composition, of a proppant consisting essentially of
            a metal-organic framework, wherein the metal-organic framework consists of a metal ion and an organic ligand, wherein the organic ligand is at least bidentate and is bonded to the metal ion.

2. The method according to claim 1, wherein the metal ion is selected from the group consisting of Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, Bi, Gd, Eu, Tb, and combinations thereof.

3. The method according to claim 2, wherein the metal ion is selected from the group consisting of Zn, Cu, Ni, Co, Fe, Mn, Cr, Cd, Mg, Ca, Zr, and combinations thereof.

4. The method according to claim 1, wherein the ligand contains a functional group selected from the group consisting of a carboxylate, a phosphonate, an amine, an azide, a cyanide, a squaryl, a heteroatom, and combinations thereof.

5. The method according to claim 4, wherein (a) the ligand contains the carboxylate functional group and is selected from the group consisting of a monocarboxylic acid; a dicarboxylic acid; a tricarboxylic acid; a tetracarboxylic acid; ions, salts and combinations thereof or (b) the ligand contains the heteroatom functional group and is selected from the group consisting of imidazole, ions, salts and combinations thereof.

6. The method according to claim 4, wherein (a) the ligand contains the carboxylate functional group and is selected from the group consisting of formic acid; acetic acid; oxalic acid; propanoic acid; butanedioic acid; (E)- butenedioic acid; benzene-1,4-dicarboxylic acid; benzene-1,3-dicarboxylic acid; benzene-1,3,5-tricarboxylic acid; 2-amino-1,4-benzenedicarboxylic acid; 2-bromo-1, 4-benzenedicarboxylic acid; biphenyl-4,4'-dicarboxylic acid; biphenyl-3,3',5,5'-tetracarboxylic acid; biphenyl-3,4',5-tricarboxylic acid; 2,5-dihydroxy-1,4-benzenedicarboxylic acid; 1,3,5-tris(4-carboxyphenyl)benzene, (2E,4E)-hexa-2,4-dienedioic acid; 1,4-naphthalenedicarboxylic acid; pyrene-2,7-dicarboxylic acid; 4,5,9,10-tetrahydropyrene-2,7-dicarboxylic acid; aspartic acid; glutamic acid; ions, salts, and combinations thereof or (b) the ligand contains the heteroatom functional group and is selected from the group consisting of adenine; 4,4'- bypiridine; pyrimidine; pyrazine; pyridine-4-carboxylic acid; pyridine-3-carboxylic acid; imidazole; 1H-benzimidazole; 2-methyl-1H-imidazole; ions, salts, and combinations thereof.

7. The method according to claim 1, wherein the metal ion is an ion of Zn and the ligand is benzene-1,4-dicarboxylic acid.

8. The method according to claim 1, wherein the metal ion is an ion of Cu and the ligand is benzene-1,3,5-tricarboxylic acid.

9. The method according to claim 1, wherein the metal-organic framework has a dry density of about 0.2 g/cm$^3$ to about 0.8 g/cm$^3$.

10. The method according to claim 1, wherein the metal-organic framework has a pore size from about 0.2 nm to about 30 nm.

11. The method according to claim 1, wherein the metal-organic framework is present in the form of a shaped body having a first dimension of at least about 0.2 mm and a second dimension of about 3 mm.

12. The method according to claim 11, wherein the shaped body is selected from the group consisting of a spherical body, a cylindrical body, a disk-shaped pellet, and combinations thereof.

13. The method according to claim 1, wherein the composition further comprises a binder.

14. The method according to claim 13, wherein the binder is selected from the group consisting of hydrated aluminum-containing binders, titanium dioxide, hydrated titanium dioxide, clay minerals, alkoxysilanes, amphiphilic substances, graphite, and combinations thereof.

15. The method according to claim 1, wherein the contacting comprises placing the composition in at least one of a fracture and flowpath in the subterranean formation.

16. The method according to claim 15, wherein the contacting comprises placing the composition in a fracture, and wherein the fracture is present in the subterranean formation when the composition is contacted with the subterranean formation.

17. The method according to claim 16, wherein the method further comprises forming the fracture or flowpath.

18. The method according to claim 1, wherein the contacting comprises gravel packing.

19. The method according to claim 1, further comprising fracturing the subterranean formation to form at least one fracture in the subterranean formation.

20. The method according to claim 1, wherein the composition further comprises a carrier fluid.

21. The method according to claim 1, wherein the proppant is present in an amount of about 0.01 wt % to about 20 wt % based upon the total weight of the composition.

22. The method according to claim 21, wherein the proppant is present in an amount of about 0.1 wt % to about 10 wt % based upon the total weight of the composition.

23. The method according to claim 1, further comprising combining the composition with an aqueous or oil-based fluid comprising a fracturing fluid, spotting fluid, clean-up fluid, completion fluid, remedial treatment fluid, abandonment fluid, pill, cementing fluid, packer fluid, or a combination thereof.

24. A system for performing the method of claim 1, the system comprising:
a tubular disposed in the subterranean formation; and
a pump configured to pump the composition in the subterranean formation through the tubular.

25. A system comprising:
a fluid composition, wherein the fluid composition comprises
0.01 to about 30 wt. %, based on the total weight of the fluid composition, of a proppant consisting essentially of
a metal-organic framework, wherein the metal-organic framework consists of a metal ion and an organic ligand, wherein the organic ligand is at least bidentate and is bonded to the metal ion; and
subterranean formation comprising the composition therein.

26. The system according to claim 25, further comprising:
a tubular disposed in the subterranean formation;
a pump configured to pump the composition in the subterranean formation through the tubular.

* * * * *